(12) United States Patent
Pettit et al.

(10) Patent No.: US 7,368,192 B2
(45) Date of Patent: May 6, 2008

(54) METHOD AND APPARATUS FOR HYDROGEN DETECTION AND DILUTION

(75) Inventors: William H Pettit, Rochester, NY (US); Steven G Goebel, Victor, NY (US); Frederick T Wagner, Fairport, NY (US)

(73) Assignee: General Motors Corporation, Detroit, MI (US)

( * ) Notice: Subject to any disclaimer, the term of this patent is extended or adjusted under 35 U.S.C. 154(b) by 659 days.

(21) Appl. No.: 10/666,008

(22) Filed: Sep. 17, 2003

(65) Prior Publication Data

US 2005/0058861 A1 Mar. 17, 2005

(51) Int. Cl.
  H01M 8/00 (2006.01)
  H01M 8/04 (2006.01)
  H01M 8/12 (2006.01)
  H01M 2/14 (2006.01)

(52) U.S. Cl. ............................. 429/12; 429/22; 429/34; 429/38

(58) Field of Classification Search ...................... None
  See application file for complete search history.

(56) References Cited

U.S. PATENT DOCUMENTS

| | | | |
|---|---|---|---|
| 6,475,651 B1 | 11/2002 | Wilkinson et al. | |
| 6,492,043 B1 | 12/2002 | Knights et al. | |
| 6,519,041 B1 | 2/2003 | Berthold | |
| 6,612,739 B2 * | 9/2003 | Shahinpoor | 374/205 |
| 6,797,421 B2 * | 9/2004 | Assarabowski et al. | 429/26 |
| 2001/0024747 A1 | 9/2001 | Sang | |
| 2002/0102452 A1 | 8/2002 | Reiser et al. | |
| 2003/0008185 A1 | 1/2003 | Sugino et al. | |
| 2003/0022037 A1 | 1/2003 | Parr et al. | |
| 2003/0022045 A1 | 1/2003 | Wells et al. | |
| 2003/0077495 A1 | 4/2003 | Scartozzi et al. | |

FOREIGN PATENT DOCUMENTS

JP 08-031436 2/1996

OTHER PUBLICATIONS

G. McMillan and D. Considine (eds.), Process/Industrial Instruments and Controls Handbook, 5th ed., 4.26-4.47.*

* cited by examiner

Primary Examiner—Patrick Joseph Ryan
Assistant Examiner—Julian Mercado (57) ABSTRACT

The present invention provides for a method and apparatus for hydrogen detection and dilution. The present invention uses an enclosure within which a variety of components of a fuel cell system are located and a ventilation stream to vent the enclosure which is induced by operation of a compressor that also is operable to supply the oxygen to the fuel cell system. The ventilation stream is directed through an outlet in the enclosure that contains a hydrogen sensor that is operable to both detect the presence of hydrogen and to consume hydrogen within the ventilation stream prior to being exhausted from the enclosure. The ventilation stream, alternatively, can be induced by operation of a fan driven by a motor which operates independently of the operation of the oxidant delivery system.

29 Claims, 3 Drawing Sheets

METHOD AND APPARATUS FOR HYDROGEN DETECTION AND DILUTION

FIELD OF THE INVENTION

The present invention relates generally to fuel cells and, more particularly, to methods and apparatuses to detect hydrogen migration in a fuel cell system.

BACKGROUND OF THE INVENTION $H_2$—$O_2$(air) fuel cells are well known in the art and have been proposed as a power source for many applications both mobile and stationary. There are several types of $H_2$—$O_2$ fuel cells including acid-type, alkaline-type, molten-carbonate-type, and solid-oxide-type. A plurality of individual cells are commonly bundled together to form a fuel cell stack. In these fuel cells hydrogen is the anode reactant (i.e., fuel) and oxygen is the cathode reactant (i.e., oxidant). The oxygen can either be in a pure form (i.e., $O_2$), or air (i.e., $O_2$ mixed with $N_2$). During the conversion of the anode reactant and cathode reactant to electrical energy, the fuel cell, regardless of the type, produces anode and cathode effluents that are exhausted from the fuel cell stack.

The fuel cell stack is typically part of a fuel cell system. The fuel cell system may include such things as a hydrogen storage device and hardware (i.e., injectors, piping, valves, sensors, etc.) associated with supplying the hydrogen to the fuel cell stack, a compressor or similar device and associated hardware for supplying the oxygen to the fuel cell stack, a coolant system and associated hardware to supply a coolant stream to the fuel cell stack, various sensors and meters, and a microprocessor or similar device operable to monitor and control the operation of the fuel cell stack and system. The fuel cell stack receives various fluid streams (i.e., a hydrogen-containing stream, an oxygen-containing stream and a coolant stream) that flow through a multitude of piping, sensors, valves and the like prior to and/or after flowing through the fuel cell stack. These various fluid steams may be separated by various membranes, gaskets and similar components. The close proximity of the fluid steams to one another and the multitude of hardware through which each stream flows represent potential sources from which hydrogen migrates and cross-contamination (i.e., an undesired mixing of two of more streams).

Such migration and cross-contamination are undesirable. To prevent migrating hydrogen from escaping the fuel cell system unimpeded, it is desirable to locate various components of the fuel cell system within an enclosure that functions to contain and direct the leaked hydrogen to a desired location or component. It is also desirable to be able to detect the presence of hydrogen in the enclosure so that a corrective action can be commenced.

SUMMARY OF THE INVENTION

The present invention provides a method and apparatus operable to detect hydrogen seepage from a fuel cell and/or fuel cell system. The present invention utilizes an enclosure to contain migrating hydrogen and to direct the migrating hydrogen to a desired location or component. The present invention utilizes a hydrogen sensor located in the enclosure to detect the presence of migrating hydrogen so that a corrective action can be commenced.

A fuel cell system according to the principles of the present invention includes a fluid tight enclosure having an outlet. There is at least one fuel cell operable to generate power using hydrogen-containing gas and oxidant-containing gas as reaction gases. The fuel cell is located in the enclosure. There is a hydrogen sensor operable to detect the presence of hydrogen positioned in a vicinity of the outlet of the enclosure. There is a ventilation stream that flows through the enclosure and exits the enclosure through the outlet. The ventilation stream continuously flows through the enclosure while the fuel cell is operating.

In another aspect, a fuel cell system according to the principles of the present invention includes an enclosure having an outlet and at least one fuel cell located in the enclosure. There is a ventilation stream that is operable to flow through the enclosure and exit the enclosure through the outlet. There is a hydrogen sensor operable to detect the presence of hydrogen positioned in a vicinity of the outlet of the enclosure. The hydrogen sensor includes a catalytic oxidation combustion element operable to react hydrogen.

In yet another aspect of the present invention, a fuel cell system includes an enclosure having an outlet and at least one fuel cell located in the enclosure. There is also a coolant reservoir located in the enclosure which is operable to hold coolant used to extract thermal energy from the fuel cell. A hydrogen sensor operable to detect the presence of hydrogen is positioned in the enclosure. There is a ventilation stream that flows through the enclosure and exits the enclosure through the outlet. At least a portion of the ventilation stream flows through the coolant reservoir prior to exiting the enclosure.

The present invention also discloses a method of operating a fuel cell system wherein the fuel cell system includes a fuel cell that is located in an enclosure that has a hydrogen sensor therein. The method includes (1) selectively operating the fuel cell to generate power; (2) supplying a continuous ventilation stream through the enclosure during operation of the fuel cell; (3) detecting the presence of hydrogen in the ventilation stream with the hydrogen sensor; and (4) discontinuing the supplying of the ventilation stream when the fuel cell is not being operated.

In another aspect of the present invention, a method of operating a fuel cell system is disclosed wherein the fuel cell system includes a fuel cell operable to generate power using hydrogen-containing gas and oxidant gas as reaction gases and the fuel cell is located in the enclosure and the oxidant gas is supplied to the fuel cell with a compressor. The method includes: (1) selectively operating the fuel cell to generate power; and (2) inducing a ventilation stream to flow through the enclosure with the compressor.

In yet another aspect of the present invention, a method of operating a fuel cell system is disclosed wherein the fuel cell system includes a fuel cell operable to generate power using hydrogen-containing gas and oxidant gas as reaction gases and is located in an enclosure which has a hydrogen sensor positioned therein. The method includes selectively supplying a hydrogen-containing test stream to the enclosure to test the operation of the hydrogen sensor.

In another aspect of the present invention, a method of operating a fuel cell system is disclosed wherein the fuel cell system includes a fuel cell located in an enclosure having a hydrogen sensor therein. The method includes: (1) selectively operating the fuel cell to generate power; (2) ventilating the enclosure with a ventilation stream during operation of the fuel cell; (3) detecting the presence of hydrogen in the ventilation stream with the hydrogen sensor; and (4) consuming detected hydrogen with the hydrogen sensor.

In still another aspect of the present invention, a method of operating a fuel cell system is disclosed wherein the fuel cell system includes a fuel cell and a coolant reservoir that are located in an enclosure. The method includes: (1) selectively operating the fuel cell to generate power; (2) ventilating the enclosure during operation of the fuel cell with a ventilation stream; and (3) routing a portion of the ventilation stream through the coolant reservoir.

In yet another aspect of the present invention, a method of operating a fuel cell system to detect a hydrogen leak is disclosed wherein the fuel cell system includes a fuel cell located in an enclosure having a hydrogen sensor therein. The method includes (a) selectively operating the fuel cell to generate power; (b) ventilating the enclosure during operation of the fuel cell with a ventilation stream; and (3) detecting a presence of hydrogen in the ventilation stream with the hydrogen sensor by monitoring a temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
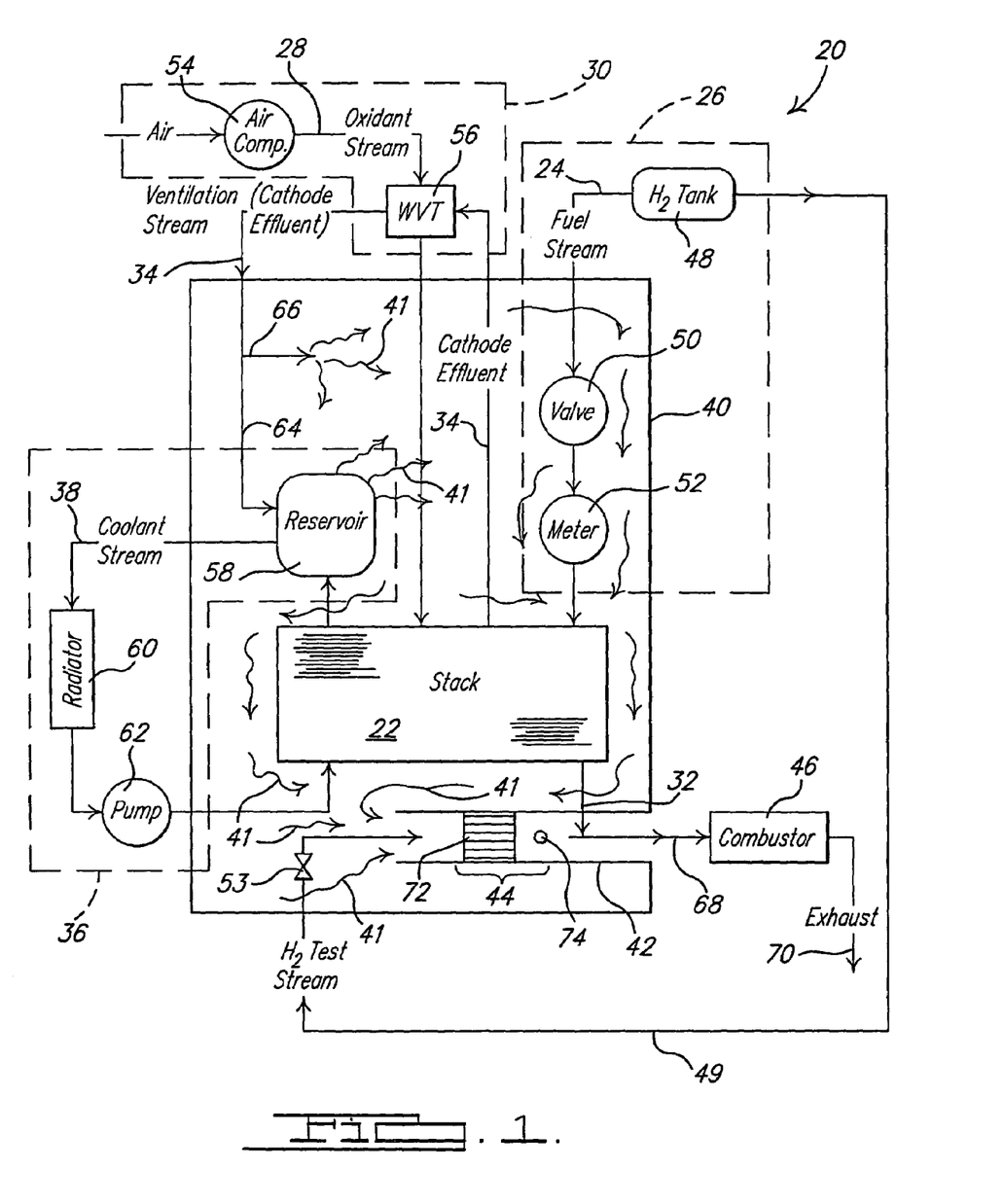
FIG. 1 is a simplified schematic representation of a first preferred embodiment of a fuel cell system according to the principles of the present invention.

A first preferred embodiment of a fuel cell system according to the principles of the present invention is shown in FIG. 1 and generally indicated as 20. Fuel cell system 20 includes a fuel cell stack 22 that is comprised of a plurality of individual fuel cells assembled together to form the stack. Fuel cell stack 22 is operable to react a hydrogen-containing fuel stream 24 supplied by a fuel delivery system 26 and an oxygen-containing oxidant stream 28 provided by an oxidant delivery system 30 to generate electrical power. The reaction of the hydrogen-containing fuel stream 24 with the oxygen-containing oxidant stream 28 within fuel cell stack 22 produces a hydrogen-containing anode effluent stream 32 and an oxygen-containing cathode effluent stream 34 in addition to the generation of electrical power. A coolant system 36 provides a coolant stream 38 that is used to extract thermal energy from fuel cell stack 22. A microprocessor (not shown) controls operation of fuel cell system 20. Fuel cell system 20 also includes a sealed enclosure 40 in which numerous components of fuel cell system 20 are located, as described below. A ventilation or dilution stream 41 flows through enclosure 40 and exits enclosure 40 via an outlet 42. There is a hydrogen sensor 44 that is located in outlet 42 of enclosure 40 and which is operable to detect the presence of hydrogen within enclosure 40. There is also a combustor system 46 operable to consume the remaining hydrogen in anode effluent stream 32.

Fuel delivery system 26 includes a storage tank 48 that stores a hydrogen-containing fuel under pressure and is operable to supply hydrogen-containing fuel stream 24 to fuel cell stack 22 and a hydrogen-containing test stream 49 to enclosure 40. Storage tank 48 is located outside of enclosure 40. Fuel delivery system also includes a valve 50 and a flow meter 52 through which hydrogen-containing fuel stream 24 flows prior to entering fuel cell stack 22 and a valve 53 through which test stream 49 flows. Valve 50, flow meter 52 and valve 53 are located within enclosure 40. Fuel cell system 20 may also include additional components (not shown) such as fuel injectors, additional valves and meters and or sensors that are preferably located within enclosure 40. Alternatively, fuel delivery system 26 can include a fuel processor (not shown) that is operable to reform a hydrocarbon fuel stream into fuel stream 24.

Oxidant delivery system 30 includes a compressor 54 that is operable to draw fresh air from the environment outside of fuel cell system 20 and supply oxidant stream 28 to fuel cell stack 22 whenever operation of fuel cell stack 22 is desired. Preferably, oxidant delivery system 30 also includes a water vapor transfer device (WVT) 56 that is operable to extract water vapor from cathode effluent stream 34 and add it to oxidant stream 28 prior to entering fuel cell stack 22. Compressor 54 compresses the intake air and forces oxidant stream 28 to flow through WVT 56 and through fuel cell stack 22 which also forces cathode effluent stream 34 to flow through fuel cell system 20, as described below. Compressor 54 and WVT 56 are preferably located outside of enclosure 40. Alternatively, WVT 56 could be within enclosure 40. Alternatively, oxidant delivery system 30 can include an oxidant-containing storage tank (not shown) operable to supply oxidant stream 28 to fuel cell stack 22.

Coolant system 36 includes a reservoir 58 that is operable to store the coolant used in coolant stream 38. Reservoir 58 is connected to a radiator 60 and a pump 62. Pump 62 is operable to cause coolant stream 38 to flow through fuel cell stack 22, reservoir 58 and radiator 60. Radiator 60 is operable to exchange thermal energy with the environment within which fuel cell system 20 is situated. Thus, coolant system 36 is operable to transfer thermal energy from fuel cell stack 22 to the environment within which fuel cell system 20 is situated. Reservoir 58 also serves as a gas separator in that any gas contained within coolant stream 38 is separated from the coolant stream 38 within reservoir 58 and coolant stream 38 is drawn off a lower portion of reservoir 58 leaving the gas in the upper portion of reservoir 58. Reservoir 58 is located within enclosure 40 and receives a portion of ventilation stream 41 which flows through reservoir 58 and into the interior space of enclosure 40, as described below. Radiator 60 and pump 62 are located outside of enclosure 40.

Cathode effluent stream 34 produced by fuel cell stack 22 is routed from fuel cell stack 22 out of enclosure 40 and through WVT 56 wherein moisture in cathode effluent stream 34 is transferred to oxidant stream 28. Cathode effluent stream 34 is then routed back into enclosure 40 and forms ventilation stream 41. Ventilation stream 41 is divided into first and second portions 64, 66. First portion 64 flows into reservoir 58 and then into the interior space of enclosure 40. First portion 64 removes and dilutes gas within reservoir 58 and provides positive ventilation of reservoir 58 into enclosure 40. Second portion 66 flows directly into enclosure 40 and joins with first portion 64 therein. Within enclosure 40, ventilation stream 41 then flows around the various components located within enclosure 40 and dilutes any gas therein and exits enclosure 40 through outlet 42 and passes through hydrogen sensor 44. With cathode effluent stream 34 flowing through fuel cell system 20 as a direct result of compressor 54 providing oxidant stream 28 to fuel cell stack 22, ventilation stream 41, which is provided by cathode effluent stream 34, is induced to flow through fuel cell system 20 by compressor 54. Accordingly, cathode effluent stream 34 and ventilation stream 41 will flow when compressor 54 is operating to supply oxidant stream 28 to fuel cell stack 22.

Anode effluent produced in fuel cell stack 22 is discharged from fuel cell stack 22 as anode effluent stream 32. Anode effluent stream 32 flows into outlet 42 of enclosure 40 downstream of hydrogen sensor 44. Anode effluent stream 32 then joins with ventilation stream 41 to form a combustion stream 68 that is routed to combustor system 46 wherein hydrogen within combustion stream 68 is either thermally or catalytically combusted to provide an environmentally friendly exhaust stream 70 that is directed to the environment within which fuel cell system 20 is situated.

Hydrogen sensor 44 includes a catalytic combustion element 72 and a reaction detecting device 74, such as a temperature sensing device. Catalytic combustion element 72 is operable to catalytically combust hydrogen when ventilation stream 41 flows through hydrogen sensor 44. Catalytic combustion element 72 is preferably a platinized monolithic structure, such as a parallel-channel cordierite monolith with an alumina wash coat and platinum catalyst thereon. Alternatively, the catalyst can be a platinum/palladium catalyst or other precious metals or combinations of such depending upon the application requirements and the economic tradeoff at the time of inception. The catalyst could also be positioned on a metal honeycomb structure or a reticulated foam structure made of YZA (Yttria-Zirconia-Alumina), silicon carbide, zirconia-toughened alumina, or alternate structures, such as a woven metal matrix, parallel-channel monolith, sintered metal series of screens, etc. Catalytic combustion element 72 is operable to catalytically combust hydrogen within ventilation stream 41 that flows therethrough. The catalytic combustion of hydrogen on catalytic combustion element 72 results in an increase in temperature of catalytic combustion element 72 and of ventilation stream 41 flowing therethrough. This increase in temperature is utilized to detect the catalytic combustion of the hydrogen on catalytic combustion element 72 and, thus, the presence of hydrogen within ventilation stream 41.

Temperature sensing device 74 is positioned downstream of catalytic combustion element 72 and is operable to detect a temperature of ventilation stream 41 downstream of catalytic combustion element 72. Temperature sensing device 74 can take a variety of forms. For example, temperature sensing device 74 can be a thermal couple, a strain gauge whose resistance varies with temperature, and/or a shape memory alloy which is a material which goes through a crystalline structure realignment at a specific temperature resulting in a geometric change which functions as an actuator or is a part of a switch.

In operation, fuel stream 24 and oxidant stream 28 are supplied to fuel cell stack 22 when it is desired to generate electrical power. That is, a microprocessor commands fuel delivery system 26 to supply a quantity of hydrogen fuel via fuel stream 24 sufficient to meet the demand placed on fuel cell system 20. Similarly, the microprocessor commands oxidant delivery system 30 to supply a sufficient quantity of oxygen via oxidant stream 28 to meet the demand placed on fuel cell system 20. The commanding of oxidant delivery system 30 to supply oxidant stream 28 causes compressor 54 to be selectively operated to supply oxidant stream 28. Fuel cell stack 22 then reacts fuel stream 24 and oxidant stream 28 to generate electrical power and also produces anode effluent stream 32 and cathode effluent stream 34. Cathode effluent stream 34, as stated above flows through WVT 56 and forms ventilation stream 41 which flows through and ventilates enclosure 40 while diluting any hydrogen gas that has migrated into enclosure 40. Cathode effluent stream 34 is pressurized via oxidant stream 28 and compressor 54 such that cathode effluent stream 34 is induced by operation of compressor 54. As such, cathode effluent stream 34 and ventilation stream 41 will be produced while fuel cell stack 22 is being operated to generate electrical power and will cease to flow when fuel cell stack 22 is not generating electrical power and oxidant delivery system 30 is not supplying oxidant stream 28 to fuel cell stack 22.

Ventilation stream 41 flows into enclosure 40 with first portion 64 flowing into reservoir 58 to ventilate reservoir 58 and direct any gases in reservoir 58 into the interior of enclosure 40. Ventilation stream 41 dilutes the gases in reservoir 58. Second portion 66 of ventilation stream 41 directly enters into the interior of enclosure 40 and rejoins with first portion 64 upon exiting reservoir 58. Ventilation stream 41 then flows throughout the interior of enclosure 40 and around the various components that are within enclosure 40. This flow path of ventilation stream 41 causes ventilation stream 41 to capture and dilute any hydrogen that has migrated from the various components within enclosure 40 and also any hydrogen that may have migrated into coolant stream 38 and separated therefrom within reservoir 58. The fluid tight nature of enclosure 40 causes the entirety of ventilation stream 41 to be discharged from enclosure 40 via outlet 42 and through hydrogen sensor 44.

Any hydrogen within ventilation stream 41 flowing through hydrogen sensor 44 will be catalytically reacted on catalytic combustion element 72. The catalytic combustion of the hydrogen within ventilation stream 41 on catalytic combustion element 72 consumes the hydrogen in ventilation stream 41 prior to ventilation stream 41 exiting enclosure 40. The catalytic combustion of hydrogen also increases the temperature of catalytic combustion element 72 and of ventilation stream 41 that is detected by temperature sensing device 74 which then sends a signal to the microprocessor indicating the presence of hydrogen within ventilation stream 41 and the combustion of the hydrogen. Thus, hydrogen sensor 44 is operable to simultaneously detect the presence of and consume hydrogen within ventilation stream 41. The ventilation stream 41 then joins anode effluent stream 32 to form combustion stream 68 that flows through combustor system 46 for removal of the hydrogen (provided by anode effluent stream 32) and is exhausted as exhaust stream 70.

The detection of the presence of hydrogen within ventilation stream 41 by hydrogen sensor 44 results in various corrective actions being taken by the microprocessor. The temperature rise of catalytic combustion element 72 and/or ventilation stream 41 will vary with the percentage of hydrogen by volume within ventilation stream 41. For example, when the hydrogen comprises approximately 4% by volume of ventilation stream 41, a temperature rise of over 300° C. would occur and be readily detectable. Even at a greatly reduced hydrogen concentration of about 1% by volume of ventilation stream 41, a temperature rise of about 80° C. would occur and also be readily detectable. Thus, the temperature detected by temperature sensing device 74 is related to the volumetric percent of hydrogen within ventilation stream 41 and can be used by the microprocessor to initiate different corrective actions. For example, depending upon the volumetric percentage of hydrogen within ventilation stream 41, as detected by the temperature rise, the microprocessor can initiate a warning signal, reduce the operational level of fuel cell stack 22, increase the quantity of oxidant 28 provided by compressor 54 to thereby increase the flow rate of ventilation stream 41, and/or cease operation of fuel cell system 20.

Based on the correlation between the temperature rise and the volumetric quantity of hydrogen within ventilation stream 41, an algorithm can be developed that provides the microprocessor with the desired corrective action based upon the temperature determined by temperature sensing device 74. Alternatively, empirical data can be used by testing a similar fuel cell system 20 in a test set up and controllably releasing various quantities of hydrogen within enclosure 40 to establish a table of temperatures and desired corrective actions that the microprocessor can use in controlling fuel cell system 20.

Periodically, hydrogen-containing test stream 49 is injected into enclosure 40 just upstream of hydrogen sensor 44 to test the operation of hydrogen sensor 44 and/or remove contaminants or poisons on catalytic combustion element 72. That is, on a desired basis, test stream 49 is supplied via fuel delivery system 26 to enclosure 40 wherein test stream 49 is catalytically combusted on catalytic combustion element 72 and the resulting temperature increase is detected by temperature sensing device 74. By controlling the quantity of hydrogen supplied via test stream 49, the operation of hydrogen sensor 44 can be verified. Additionally, the test stream 49 can also be used to increase the temperature of hydrogen sensor 44 via catalytic combustion on catalytic combustion element 72 thereby reacting any poisons and contaminants on catalytic combustion element 72.

Thus, fuel cell system 20 is operable to selectively generate electrical power via fuel cell stack 22 while also being operable to detect hydrogen migration within the portion of fuel cell system 20 within enclosure 40. The present invention also provides for the simultaneous consumption of the migrated hydrogen in addition to detecting its presence.

Figure 2:
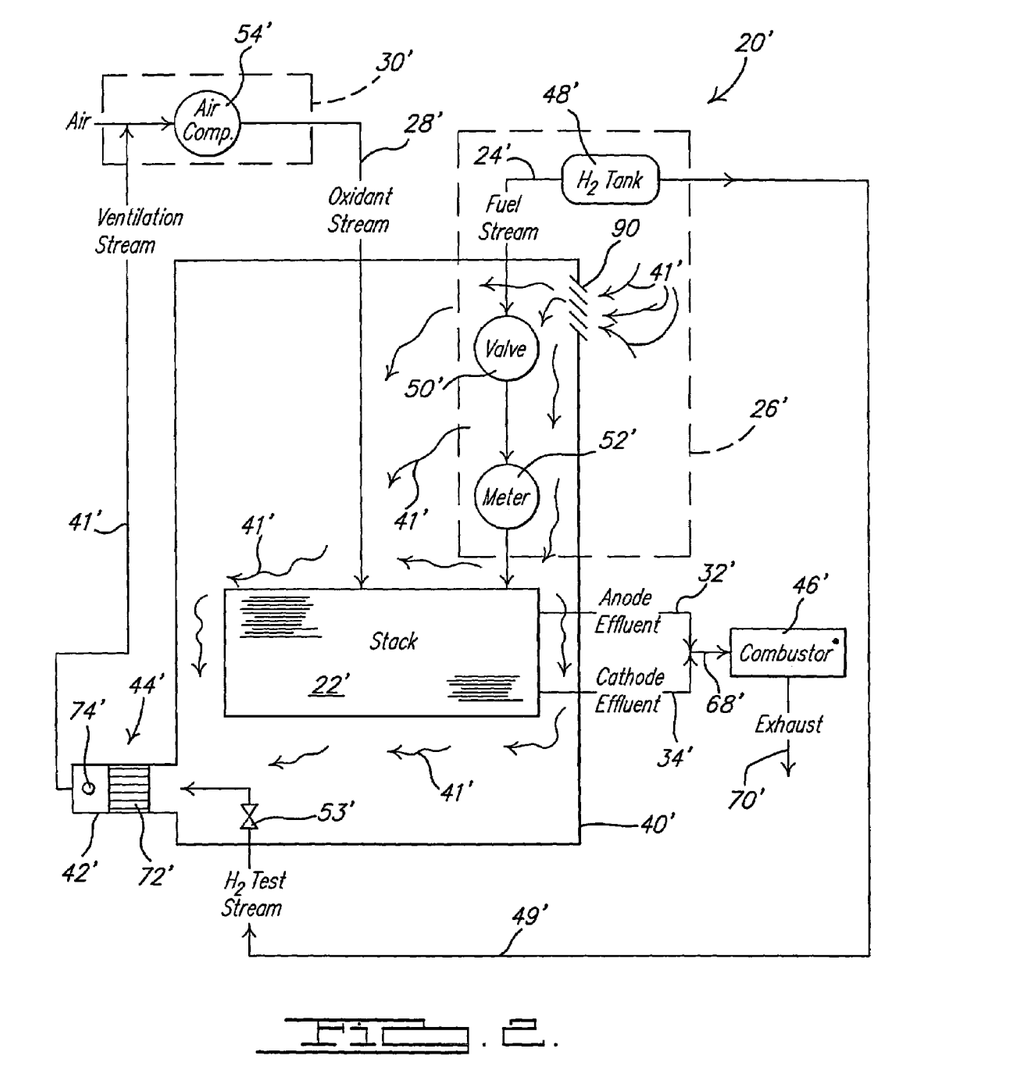
FIG. 2 is a simplified schematic representation of a second preferred embodiment of a fuel cell system according to the principles of the present invention.

Referring now to FIG. 2, a second preferred embodiment of a fuel cell system 20' according to the principles of the present invention is shown. Fuel cell system 20' is substantially identical to fuel cell system 20, shown in FIG. 1. A main difference between fuel cell system 20' and fuel cell system 20 is that while ventilation stream 41' is induced by compressor 54' of oxidant delivery system 30', ventilation stream 41' is not formed from cathode effluent stream 34'. Additionally, in fuel cell system 20', ventilation stream 41' does not flow through a reservoir of a coolant system for fuel cell stack 22'. Therefore, ventilation stream 41 optionally flow through a reservoir of a coolant system (this approach does not preclude the use of coolant reservoir ventilation), but for simplicity purposes, the coolant system in fuel cell system 20' is not shown. It should be appreciated, however, that a portion of ventilation stream 41' could flow through a coolant reservoir, if desired. Hydrogen sensor 44' is substantially identical to that disclosed in the first preferred embodiment discussed above. For simplicity, anode effluent stream 32' is shown as directly joining cathode effluent stream 34' prior to entering combustor system 46'. In this embodiment, anode effluent stream 32' is not shown as flowing through a WVT, as shown in FIG. 1 and discussed above with reference to the first preferred embodiment. However, it should be appreciated that a WVT can be employed in this embodiment so that water vapor from cathode effluent stream 34' is transferred to oxidant stream 28' prior to oxidant stream 28' flowing into fuel cell stack 22', if desired.

As stated above, in fuel cell system 20', ventilation stream 41' is still induced by compressor 54' of oxidant delivery system 30'. In the second embodiment, however, ventilation stream 41' is drawn into enclosure 40' from the environment within which fuel cell system 20' is located with an inlet 90 in enclosure 40'. To accomplish this, outlet 42' of enclosure 40' is connected to an inlet side of compressor 54' so that compressor 54' will pull ventilation stream 41' from the environment within which fuel cell system 20' is located via inlet 90, through the interior of enclosure 40 around the various components therein and through hydrogen sensor 44' and feed ventilation stream 41' into compressor 54' to form a portion of oxidant stream 28'. Thus, in this second preferred embodiment, ventilation stream 41' will be induced to flow through enclosure 40' and through hydrogen sensor 44' whenever compressor 54' is operating to supply oxidant stream 28' to fuel cell stack 22'.

Since ventilation stream 41' is induced by operation of compressor 54', the quantity or flow rate of ventilation stream 41' is controlled by the operation of compressor 54'. For example, the larger suction demand induced by compressor 54' will cause an increase in the flow rate of ventilation stream 41'. Additionally, there can be a control valve (not shown) in ventilation stream 41' just prior to the inlet portion of compressor 54' to control the flow rate of ventilation stream 41'. Thus, the quantity or flow rate of ventilation stream 41' flowing through enclosure 40' can vary, and is induced by operation of compressor 54'.

Operation of fuel cell system 20' is substantially identical to that of fuel cell system 20 shown in FIG. 1 and discussed above. As such, only the differences in operation of fuel cell system 20' are discussed.

In operation of this embodiment, the microprocessor commands fuel delivery system 26' and oxidant delivery system 30' to supply a quantity of hydrogen fuel via fuel stream 24' and oxygen via oxidant stream 28' to meet the demand placed on fuel cell system 20'. The commanding of oxidant delivery system 30' to supply oxidant stream 28' causes compressor 54' to be selectively operated to supply oxidant stream 28'. The operation of compressor 54' begins to pull a vacuum on enclosure 40' which pulls air from the exterior of enclosure 40' into the interior of enclosure 40' via inlet 90 to form ventilation stream 41'. Ventilation stream 41' then flows around the components within enclosure 40' and through catalytic combustion element 72' and temperature sensing device 74' of hydrogen sensor 44'. Ventilation stream 41' then flows into the inlet side of compressor 54' to form a portion of oxidant stream 28' supplied to fuel cell stack 22'.

Fuel cell stack 22' reacts fuel stream 24' and oxidant stream 28' to generate electrical power and also produces anode effluent stream 32' and cathode effluent stream 34'. The cathode and anode effluent streams 32', 34' join together outside of enclosure 40' to form combustion stream 68'. Alternatively, anode and cathode effluent streams 32', 34' can join together within the interior of enclosure 40', if desired. Combustion stream 68' then flows through combustor system 46' wherein hydrogen contributed by anode effluent stream 32' is either thermally or catalytically combusted to produce an environmentally friendly exhaust stream 70' that is vented to the environment.

The flowing of the entirety of ventilation stream 41' through hydrogen sensor 44' allows the detection and simultaneous consumption of any hydrogen within ventilation stream 41'. That is, the flow of ventilation stream 41' around the various components with an enclosure 40' causes any hydrogen that has migrated into enclosure 40' to be diluted and join with ventilation stream 41' and flow through hydrogen sensor 44'. Catalytic combustion element 72' will then catalytically combust the hydrogen within ventilation stream 41' thereby causing a temperature increase in catalytic combustion element 72' and in ventilation stream 41' downstream of catalytic combustion element 72'. This increase in temperature is detected by the microprocessor via temperature sensing device 74' detecting an increase in temperature in ventilation stream 41' and/or catalytic combustion element 72'. The microprocessor then adjusts operation of fuel cell system 20', as desired, when the presence of hydrogen in ventilation stream 41' has been detected, as discussed above.

Periodically, hydrogen-containing test stream 49' is injected into enclosure 40' just upstream of hydrogen sensor 44' to test the operation of hydrogen sensor 44' and/or remove contaminants or poison on catalytic combustion element 72'. That is, on a desired basis, test stream 49' is supplied via fuel delivery system 26' to enclosure 40' wherein test stream 49' is catalytically combusted on catalytic combustion element 72' and the resulting temperature increase is detected by temperature sensing device 74'. By controlling the quantity of hydrogen supplied via test stream 49', the operation of hydrogen sensor 44' can be verified. Additionally, test stream 49' can also be used to increase a temperature of hydrogen sensor 44' via catalytic combustion on catalytic combustion element 72' thereby reacting any poisons and contaminants on the catalytic combustion element 72'. Thus, fuel cell system 20' is operable to selectively generate electrical power via fuel cell stack 22' while also being operable to detect hydrogen migration within a portion of fuel cell system 20' within enclosure 40'. The present invention also provides for the simultaneous consumption of migrated hydrogen in addition to detecting its presence.

Figure 3:
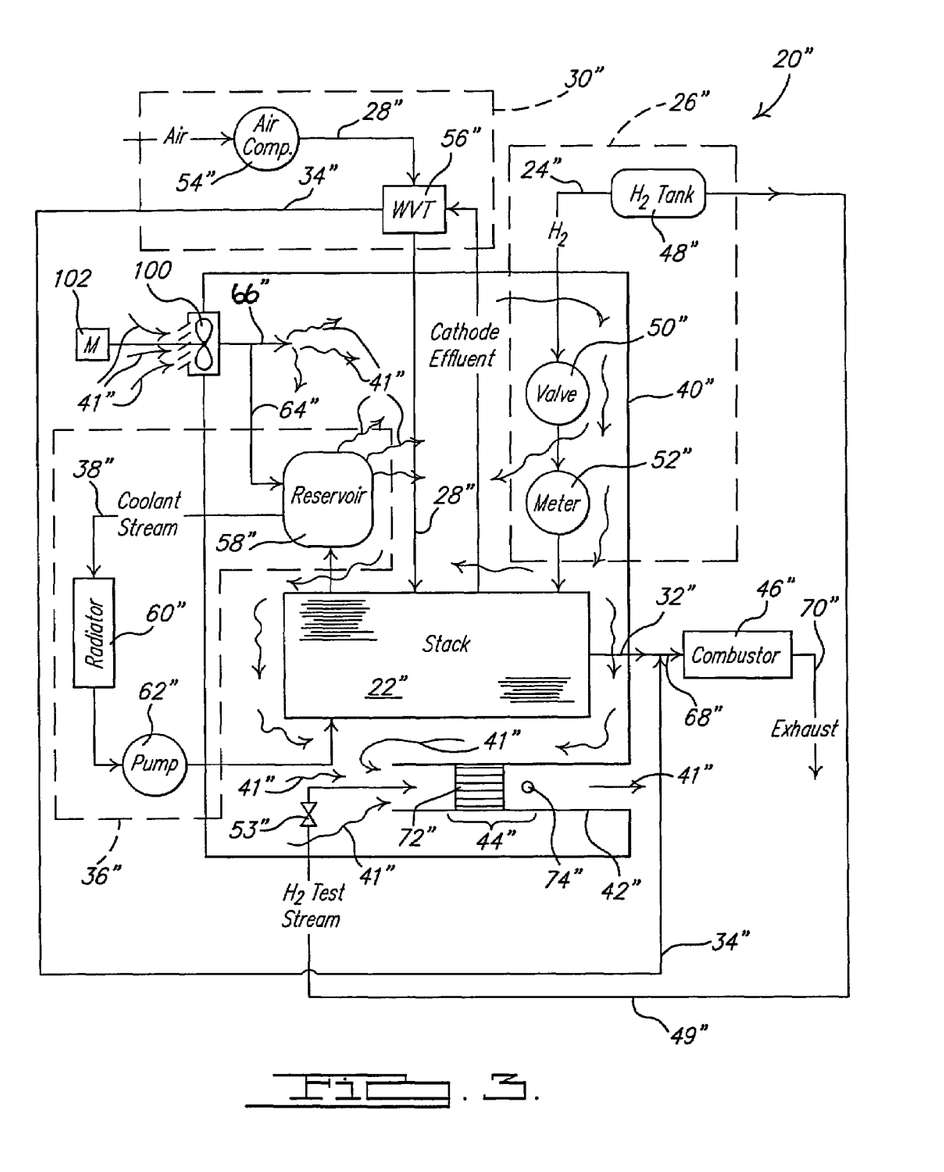
FIG. 3 is a simplified schematic representation of an alternate embodiment of a fuel cell system according to the principles of the present invention.

Referring now to FIG. 3, an alternate embodiment of a fuel cell system 20" according to the principles of the present invention is shown. This embodiment is substantially identical with that of fuel cell system 20, shown in FIG. 1, with the main exception again being that the cathode effluent is not used to form ventilation stream 41" with the additional caveat that ventilation stream 41" is not induced by operation of compressor 54". Rather, in this embodiment, ventilation stream 41" is induced by a fan 100 that is driven by a motor 102, as discussed below. With this configuration, cathode effluent stream 34" immediately upon exiting WVT 56" joins with anode effluent stream 32" to form combustion stream 68" that flows to combustor system 46".

In this embodiment, ventilation stream 41" is induced by the selective operation of fan 100, as controlled by the microprocessor. That is, when it is desired to ventilate enclosure 40", the microprocessor commands motor 102 to operate fan 100 to induce ventilation stream 41" to flow through enclosure 40". Ventilation stream 41" is drawn from the environment within which fuel cell system 20" is located. A first portion 64" of ventilation stream 41" then flows through reservoir 58" of coolant system 36" and into the interior of enclosure 40". Simultaneously, second portion 66" of ventilation stream 41" flows directly into enclosure 40" and joins with first portion 64" therein. Ventilation stream 41" then flows around the various components within enclosure 40" and exits enclosure 40" through outlet 42" while passing through hydrogen sensor 44". Hydrogen sensor 44" is substantially identical to that discussed above with reference to the first preferred embodiment and, as such, will not be discussed further. As ventilation stream 41" flows through hydrogen sensor 44", the presence of hydrogen within ventilation stream 41" will be detected and consumed by hydrogen sensor 44" prior to ventilation stream 41" being vented into the environment within which fuel cell system 20" is located.

In operation, when fuel cell system 20" is operated to generate electrical power via fuel cell stack 22", fan 100 is operated to cause ventilation stream 41" to flow through enclosure 40". That is, whenever stack 22" is operated to generate electrical power, ventilation stream 41" is caused to flow through enclosure 40" by fan 100. Because ventilation stream 41" is not induced by operation of compressor 54", fan 100 can be operated to continue to supply a ventilation stream 41" through enclosure 40" even after operation of oxidant delivery system 30" has ceased. Thus, this embodiment can provide a ventilation stream 41" through enclosure 40" at any time it is desired by the microprocessor commanding motor 102 to drive fan 100 which is independent of the operation of fuel cell stack 22" and/or oxidant delivery system 30". Test stream 49" is selectively added to enclosure 40" to test hydrogen sensor 44" and/or combust contaminants thereon, as described above.

Thus, the present invention provides for a method and apparatus for hydrogen detection and dilution. The present invention uses an enclosure within which a variety of components of a fuel cell system are located and a ventilation stream to vent the enclosure which is induced by operation of a compressor of the oxidant delivery system. The ventilation stream is directed through an outlet in the enclosure that contains a hydrogen sensor that is operable to both detect the presence of hydrogen and to consume the hydrogen within the ventilation stream prior to being exhausted from the enclosure. The ventilation stream, alternatively, can also be induced by operation of a fan driven by a motor which operates independently of the operation of the oxidant delivery system.

It should be appreciated that while the hydrogen sensor includes a catalytic combustion element and a temperature sensing device, other devices that are operable to detect the catalytic combustion of hydrogen on the catalytic combustion element of the hydrogen sensor can be employed without departing from the spirit and scope of the present invention. Thus, the description of the invention is merely exemplary in nature and variations that do not depart from the gist of the invention are intended to be within the scope of the invention. Such variations are not to be regarded as a departure from the spirit and scope of the invention.

What is claimed is:

1. A fuel cell system comprising:
   a fluid tight enclosure having an outlet;
   at least one fuel cell operable to generate power using hydrogen-containing gas and oxidant gas as reaction gases, said fuel cell being located in said enclosure;
   a hydrogen sensor operable to detect the presence of hydrogen in a ventilation stream, said hydrogen sensor being positioned in said outlet of said enclosure; and
   said ventilation stream flowing through said enclosure and exiting said enclosure through said outlet, said ventilation stream in contact with said hydrogen sensor when flowing through said outlet.

2. The fuel cell system of 1, wherein said hydrogen sensor includes:
   a catalytic combustion element operable to consume hydrogen; and a temperature sensor operable to detect a change in temperature.

3. The fuel cell system of claim 2, wherein essentially all of said ventilation stream flows through said catalytic combustion element.

4. The fuel cell system of claim 3, wherein said hydrogen sensor simultaneously detects and consumes hydrogen.

5. The system of claim 1, further comprising a hydrogen-containing test stream, said test stream being selectively added to said enclosure to test operation of said hydrogen sensor.

6. The fuel cell system of claim 1, wherein said ventilation stream continuously flows through said enclosure during operation of said fuel cell.

7. A fuel cell system comprising:
a fluid tight enclosure having an outlet;
at least one fuel cell operable to generate power using hydrogen-containing gas and oxidant gas as reaction gases, said fuel cell being located in said enclosure;
a ventilation stream flowing through said enclosure and exiting said enclosure through said outlet;
a hydrogen sensor operable to detect the presence of hydrogen in said ventilation stream, said hydrogen sensor being in contact with said ventilation stream;
a compressor operable to supply said oxidant gas to said fuel cell; and
a flow path communicating with said compressor and said enclosure and through which said compressor induces flow of said ventilation stream.

8. The fuel cell system of claim 7, wherein said hydrogen sensor is in said outlet and said ventilation stream is in contact with said sensor when flowing through said outlet.

9. A fuel cell system comprising:
a fluid tight enclosure having an outlet;
at least one fuel cell operable to generate power using hydrogen-containing gas and oxidant gas as reaction gases, said fuel cell being located in said enclosure;
a ventilation stream flowing through said enclosure and exiting said enclosure through said outlet;
a hydrogen sensor operable to detect the presence of hydrogen, said hydrogen sensor being in contact with said ventilation stream; and
a compressor operable to supply said oxidant gas to said fuel cell and to induce flow of said ventilation stream,
wherein said enclosure includes an inlet through which said ventilation stream enters said enclosure, said outlet of said enclosure is in fluid communication with an inlet of said compressor, and said compressor draws said ventilation stream from said inlet of said enclosure through said enclosure and outlet and into said compressor.

10. A fuel cell system comprising:
a fluid tight enclosure having an outlet;
at least one fuel cell operable to generate power using hydrogen-containing gas and oxidant gas as reaction gases, said fuel cell being located in said enclosure;
a ventilation stream flowing through said enclosure and exiting said enclosure through said outlet;
a hydrogen sensor operable to detect the presence of hydrogen in said ventilation stream, said hydrogen sensor being in contact with said ventilation stream; and
a flow path communicating with a cathode side of said at least one fuel cell and said enclosure and through which a portion of a cathode effluent produced by said fuel cell can be discharged into said enclosure and form at least a part of said ventilation stream.

11. The fuel cell system of claim 10 wherein said flow path directs essentially all of said cathode effluent into said enclosure.

12. A fuel cell system comprising:
an enclosure having an outlet and an inlet, said inlet communicating with the environment;
at least one fuel cell operable to generate power using hydrogen-containing gas and oxidant gas as reaction gases, said fuel cell being located in said enclosure;
a ventilation stream operable to enter said enclosure through said inlet, flow through said enclosure, and exit said enclosure through said outlet;
a hydrogen sensor operable to detect the presence of hydrogen in said ventilation stream, said hydrogen sensor being positioned in a vicinity of said outlet of said enclosure, and said hydrogen sensor including a catalytic combustion element operable to react hydrogen.

13. The fuel cell system of claim 12, wherein said hydrogen sensor further includes a temperature sensor operable to detect a change in temperature as a result of hydrogen reacting in the presence of said catalytic combustion element.

14. The fuel cell system of claim 13, wherein said temperature sensor is a thermocouple.

15. The fuel cell system of claim 13, wherein said temperature sensor is a strain gage having a resistance that changes with a change in temperature.

16. The fuel cell system of claim 13, wherein said temperature sensor includes a shape memory alloy.

17. Th fuel cell system of claim 12, wherein essentially all of said ventilation stream flows through said catalytic combustion element prior to exiting said enclosure.

18. The fuel cell system of claim 12, wherein said hydrogen sensor is disposed in said outlet.

19. The fuel cell system of claim 12, further comprising a supply device supplying said oxidant gas to said fuel cell and a flow path communicating with said supply device and said enclosure and through which said supply device induces flow of said ventilation stream through said enclosure.

20. A fuel cell system comprising:
an enclosure having an outlet;
at least one fuel cell operable to generate power using hydrogen-containing gas and oxidant gas as reaction gases, said fuel cell being located in said enclosure;
a coolant reservoir operable to hold coolant used to extract thermal energy from said fuel cell, said coolant reservoir being located in said enclosure;
a hydrogen sensor positioned in said enclosure, said hydrogen sensor being operable to detect the presence of hydrogen;
a ventilation stream flowing through said enclosure and exiting said enclosure through said outlet; and
wherein at least a portion of said ventilation stream flows through said coolant reservoir prior to exiting said enclosure.

21. The fuel cell system of claim 20, wherein said coolant reservoir comprises a gas separator operable to separate gas from said coolant.

22. The fuel cell system of claim 20, wherein said ventilation stream is in direct contact with said coolant in said reservoir.

23. A fuel cell system comprising:
a fluid tight enclosure having an outlet and an inlet, said inlet communicating with the environment external to said enclosure;

at least one fuel cell operable to generate power using hydrogen-containing anode and oxidant-containing cathode as reactants, said fuel cell being located in said enclosure;

a hydrogen sensor operable to detect the presence of hydrogen in a ventilation stream, said hydrogen sensor being positioned in said enclosure; and said ventilation stream flowing through said enclosure, said ventilation stream entering said enclosure through said inlet and exiting said enclosure through said outlet, and essentially an entirety of said ventilation stream flowing in contact with said hydrogen sensor prior to exiting said enclosure.

24. The fuel cell system of claim 23, further comprising a supply device supplying said cathode reactant to said fuel cell and a flow path communicating with said supply device and said enclosure and through which said supply device induces flow of said ventilation stream into said enclosure through said inlet.

25. The fuel cell system of claim 23, wherein said hydrogen sensor is disposed in said outlet of said enclosure.

26. The fuel cell system of claim 23, wherein said hydrogen sensor includes a temperature sensor and a catalytic combustion element operable to react hydrogen.

27. A fuel cell system comprising:

an enclosure having an outlet;

at least one fuel cell operable to generate power using hydrogen-containing gas and oxidant containing as reaction gases; said fuel cell being located in said enclosure;

a hydrogen sensor positioned in said enclosure operable to detect the presence of hydrogen in a ventilation stream; and said ventilation stream flowing through said enclosure and exiting said enclosure through said outlet, wherein said ventilation stream flows through at least a portion of said enclosure prior to encountering said hydrogen sensor.

28. The fuel cell system of claim 27, wherein said ventilation stream flows through said enclosure and encounters said hydrogen sensor just prior to exiting said enclosure.

29. The fuel cell system of claim 28, wherein said hydrogen sensor is disposed in said outlet.

* * * * *